United States Patent

Mesch et al.

[11] Patent Number: 6,094,992
[45] Date of Patent: Aug. 1, 2000

[54] METHOD FOR ELECTROMAGNETIC FLOW MEASUREMENT AND A CORRESPONDING FLOWMETER

[76] Inventors: Franz Mesch, Rehbuckel 50, D-76228 Karlsruhe; Boris Horner, Schückstrasse 4, D-76131 Karlsruhe, both of Germany

[21] Appl. No.: 09/076,383

[22] Filed: May 12, 1998

Related U.S. Application Data

[60] Provisional application No. 60/048,663, Jun. 5, 1997.

[30] Foreign Application Priority Data

May 15, 1997 [EP] European Pat. Off. ............. 97810300

[51] Int. Cl.[7] ..................................................... G01F 1/58
[52] U.S. Cl. .................... 73/861.15; 73/861.13; 73/861.12
[58] Field of Search ............................ 73/861.13, 861.12, 73/861.15

[56] References Cited

U.S. PATENT DOCUMENTS

| 2,896,451 | 7/1959 | Rinia ................................... 73/861.15 |
| 4,008,609 | 2/1977 | Lambrecht et al. . |
| 4,015,471 | 4/1977 | Marsh ................................. 73/861.15 |
| 4,290,312 | 9/1981 | Kobayashi . |
| 5,925,830 | 7/1999 | Schalk ................................ 73/861.13 |

FOREIGN PATENT DOCUMENTS

| WO 93/09403 | 5/1993 | WIPO . |
| WO 96/18086 | 6/1996 | WIPO . |

OTHER PUBLICATIONS

B. Horner, F. Mesch and A. Trächtler, *A multi–sensor induction flowmeter reducing errors due to non–axisymmetric flow profiles*, Meas. Sci. Technol. 7 (1996), pp. 354–360.

*Primary Examiner*—Harshad Patel
*Attorney, Agent, or Firm*—Bose McKinney & Evans LLP

[57] ABSTRACT

This electromagnetic flow measuring method and the corresponding flowmeter serve to improve the measuring accuracy in the range of measuring errors below 1% in conjunction with acceptable costs. The meter includes a tube (1), in which the fluid to be measured flows during operation. A single pair (2) of magnetic field coils is arranged on the lateral surface of the tube (1) on a magnetic field diameter (3) for generating a magnetic field. A first electrode pair including a first and a second electrode (41, 42), a second electrode pair including a third and a fourth electrode (43, 44), and a third electrode pair including a fifth and a sixth electrode (45, 46) touch the fluid. The first pair is arranged on diameter ($4_1$) and forms an angle of 90° with the diameter (3); the second pair is arranged on diameter ($4_2$) and forms an angle of approx. 45° with diameter ($4_1$); the third pair is arranged on diameter ($4_3$) and forms an angle of approx. 90° with diameter ($4_2$). A measuring circuit processes electrode pair voltages ($u_1$, $u_2$, $u_3$). Only a portion of voltage ($u_2$), which lies between 0.1 and 0.7 and is processed together with voltage ($u_1$), and only the same portion lying between 0.1 and 0.7 of voltage ($u_3$) is processed together with the voltage ($u_1$).

3 Claims, 3 Drawing Sheets

METHOD FOR ELECTROMAGNETIC FLOW MEASUREMENT AND A CORRESPONDING FLOWMETER

This appln claims benefit of provisional appln 60/048,663 filed Jun. 5, 1997.

FIELD OF THE INVENTION

The invention relates to electromagnetic flowmeters having a measuring tube for guiding an electrically conductive fluid to be measured.

The Journal "Meas. Sci. Technol.", volume 7, 1996, pages 354 to 357 describes an electromagnetic flowmeter
- having a measuring tube,
  - in which an electrically conductive fluid to be measured flows during operation,
- having a single pair of means, arranged on a magnetic field diameter of the measuring tube, for generating a magnetic field which is spatially homogeneous in the direction of the magnetic field diameter,
- having a first electrode pair, which comprises a first and a second electrode and at which a first electrode voltage is produced during operation,
- having a second electrode pair, which comprises a third and a fourth electrode and at which a second electrode voltage is produced during operation,
- having a third electrode pair, which comprises a fifth and a sixth electrode and at which a third electrode voltage is produced during operation,
  - the electrodes touching the fluid,
  - the first electrode pair being arranged on a first electrode diameter of the measuring tube, which forms an angle of 90° with the magnetic field diameter,
  - the second electrode pair being arranged on a second electrode diameter of the measuring tube, which forms an angle of approximately 45° with the first electrode diameter, and
  - the third electrode pair being arranged on a third electrode diameter of the measuring tube, which forms an angle of approximately 90° with the second electrode diameter, and
- having a measuring circuit for processing the electrode voltages.

This type, described above, of electromagnetic flowmeters renders it possible to improve the accuracy of flow measurement by comparison with conventional electromagnetic flowmeters even in the case of flow profiles which are rotational asymmetric.

SUMMARY OF THE INVENTION

In the case of conventional electromagnetic flowmeters with only two electrodes, an attempt is usually made, by means of straight, upstream pipe sections, so-called inlet sections, to render the rotationally asymmetric flow profiles rotationally symmetrical again. The length of the inlet sections and thus the production costs they entail increase disproportionately, however, the larger the nominal diameter. The length of the inlet sections can be reduced by means of the arrangement described above.

However, this improvement is frequently still not sufficient, in particular if the aim is to achieve a high accuracy in accordance with measuring errors of less than 1%.

According to pages 358 to 360 loco citato, it is possible to achieve a further improvement in the accuracy with respect to the electromagnetic flowmeters by means of a single spatially homogeneous magnetic field with a second spatially homogeneous magnetic field at right angles thereto.

In order further to improve the measuring accuracy in the range of measuring errors below 1% in conjunction with acceptable costs without the outlay on apparatus required to generate the second magnetic field, after further investigations by the inventors, a first variant of the invention consists in a method for measuring the volume flow rate of an electrically conductive fluid by means of an electromagnetic flowmeter which comprises:
- a measuring tube,
  - in which the fluid flows during operation and which is constructed in an electrically insulating fashion on its inside touching the fluid,
- a single pair of means, arranged on the lateral surface of the measuring tube on a magnetic field diameter of the measuring tube, for generating a magnetic field which is spatially inhomogeneous in the direction of the magnetic field diameter,
- a first electrode pair, which comprises a first and a second electrode and at which a first electrode voltage is produced during operation,
- a second electrode pair, which comprises a third and a fourth electrode and at which a second electrode voltage is produced during operation,
- a third electrode pair, which comprises a fifth and a sixth electrode and at which a third electrode voltage is produced during operation,
  - the electrodes having a surface which is larger than a dot but finite, and touching the fluid, the first electrode pair being arranged on a first electrode diameter of the measuring tube, which forms an angle of 90° with the magnetic field diameter,
  - the second electrode pair being arranged on a second electrode diameter of the measuring tube, which forms an angle of approximately 45° with the first electrode diameter, and
  - the third electrode pair being arranged on a third electrode diameter of the measuring tube, which forms an angle of approximately 90° with the second electrode diameter,
- an excitation circuit for feeding the means for generating the magnetic field with current, and
- a measuring circuit for processing the first, second and third electrode voltage, in which method
  only a portion lying between 0.1 and 0.7 of the second electrode voltage is processed by the measuring circuit together with the first electrode voltage, and only the same part of the third electrode voltage as the part lying between 0.1 and 0.7 is processed by the measuring circuit together with the first electrode voltage.

For the purpose of further improving the measuring accuracy in the range of measuring errors below 1% in conjunction with acceptable costs without the outlay on apparatus required to generate the second magnetic field, after further investigations by the inventors a second variant of the invention consists in an electromagnetic flowmeter
- having a measuring tube,
  - in which during operation an electrically conductive fluid to be measured flows, and which is constructed in an electrically insulating fashion on its inside touching the fluid,
- having a single pair of means, arranged on the lateral surface of the measuring tube on a magnetic field diameter of the measuring tube, for generating a magnetic field which is spatially inhomogeneous in the direction of the magnetic field diameter, having a first electrode pair, which comprises a first and a second electrode and at which a first electrode voltage is produced during operation, having a second electrode pair, which comprises a third and a fourth electrode and at which a second electrode voltage is produced during operation, having a third electrode pair, which comprises a fifth and a sixth electrode and at which a third electrode voltage is produced during operation, the electrodes having a surface which is larger than a dot but finite, and touching the fluid, the first electrode pair being arranged on a first electrode diameter of the measuring tube, which forms an angle of 90° with the magnetic field diameter, the second electrode pair being arranged on a second electrode diameter of the measuring tube, which forms an angle of approximately 45° with the first electrode diameter, and the third electrode pair being arranged on a third electrode diameter of the measuring tube, which forms an angle of approximately 90° with the second electrode diameter, having an excitation circuit for feeding the means for generating the magnetic field with current, and having a measuring circuit for processing the first, second and third electrode voltage, which comprises:

an adder stage having a first, a second and a third input, a first multiplier stage having a first and a second input as well as an output, a second multiplier stage having a first and a second input as well as an output, in which measuring circuit the first electrode voltage is coupled to the first input of the adder stage, the second electrode voltage is coupled to the first input of the first multiplier stage, the third electrode voltage is coupled to the first input of the second multiplier stage, the second input of the first multiplier stage and the second input of the second multiplier stage are fed a multiplier signal (F) representing a multiplier factor f which lies between 0.1 and 0.7, and the output of the adder stage supplies a signal proportional to the volume flow rate.

According to a preferred embodiment of the second variant of the invention, the measuring circuit is characterized in that the first electrode voltage is fed on the input side to a first decoupling amplifier with one output, that the second electrode voltage is fed on the input side to a second decoupling amplifier with one output, that the third electrode voltage is fed on the input side to a third decoupling amplifier with one output, which decoupling amplifiers have the same gain, that, via a first resistor having a resistance value R, the output of the first decoupling amplifier is connected to an inverting input of a differential amplifier, of which a non-inverting input is connected to a circuit zero point, and of which an output is connected to the inverting input via a second resistor having the resistance value R, and supplies the signal proportional to the volume flow rate, that the output of the second decoupling amplifier is connected to the inverting input of the differential amplifier via a third resistor having a resistance value R/f, and that the output of the third decoupling amplifier is connected to the inverting input of the differential amplifier via a fourth resistor having the resistance value R/f.

The surprising fact about the invention is that although, because of the angle of approximately +45° or approximately −45° at which the second electrode diameter or the third electrode diameter intersects the direction of the single magnetic field, the second electrode voltage and the third electrode voltage are already smaller than the first electrode voltage, a further reduction of the second and the third electrode voltages to a multiple of 0.1 to 0.7 is necessary in order to achieve the abovementioned object.

One advantage of the invention consists in that the measuring accuracy is improved in the case of rotationally asymmetric flow profiles and in the case of spatially inhomogeneous magnetic fields such as relatively always occur in practice. Such rotationally asymmetric flow profiles occur, for example, downstream of orifices, valves, plug valves, slide valves or bends in pipelines. Consequently, in the case of the invention the above-mentioned inlet sections can be substantially shortened if not even entirely omitted.

BRIEF DESCRIPTION OF THE DRAWINGS

The invention will now be explained in more detail with the aid of exemplary embodiments represented in the figures of the drawing, in which.

DETAILED DESCRIPTION OF THE DRAWINGS

Figure 1:
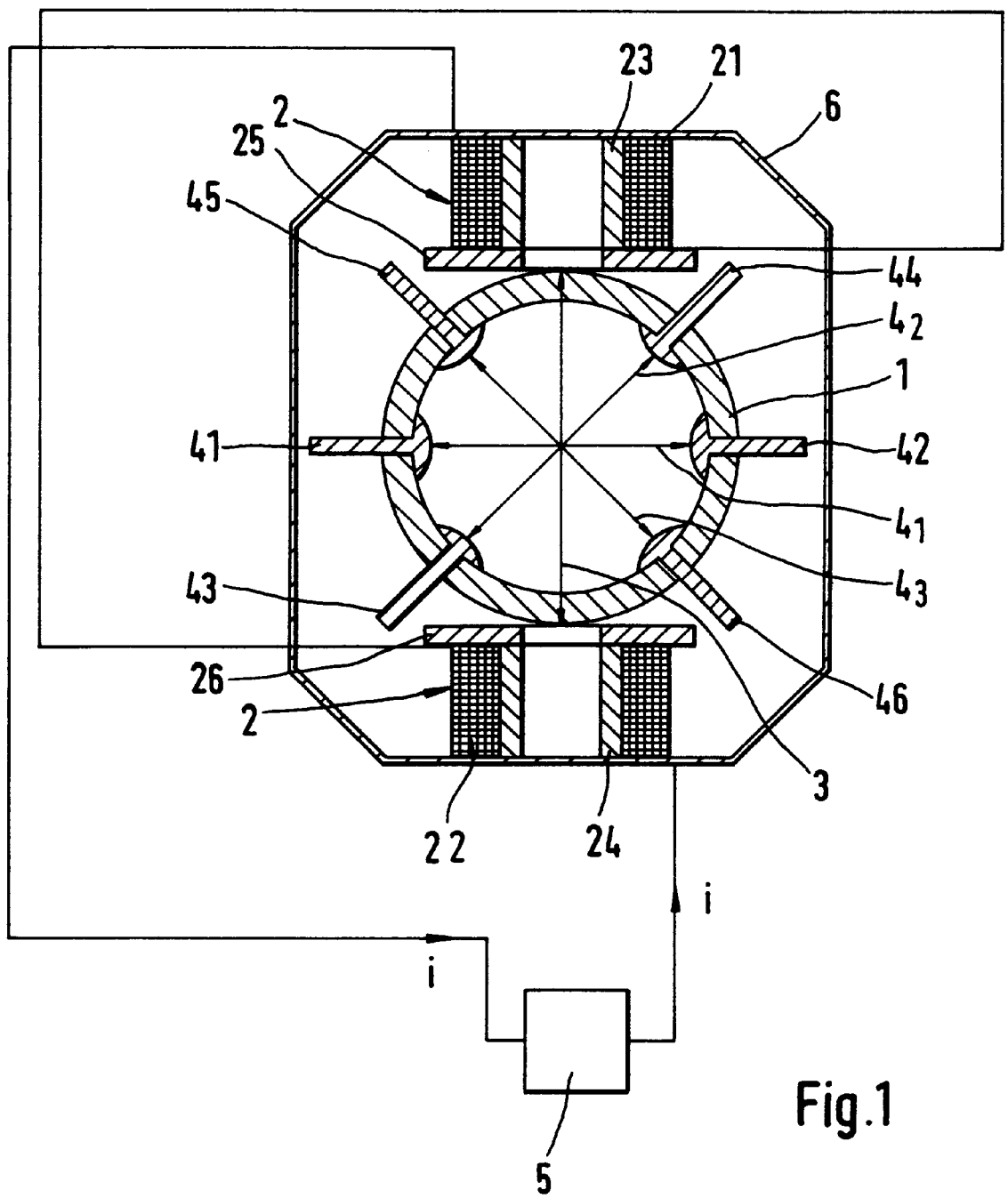
FIG. 1 shows a diagram of the cross section of the structural design of a measuring sensor of an electromagnetic flowmeter.

The individual parts, important for functioning, of a measuring sensor of an electromagnetic flowmeter are shown in FIG. 1 in a severely diagrammatic fashion. Initially, this is a measuring tube 1 for guiding an electrically conductive fluid to be measured.

This measuring tube 1 is constructed in an electrically insulating fashion on its inside touching the fluid, specifically, on the one hand, owing to the fact that, for example, the measuring tube 1 itself consists completely of an insulating material, in particular of sintered ceramic, preferably of aluminum oxide ceramic, or of a plastic, preferably hard rubber.

On the other hand, the measuring tube 1 can also be realized by coating a non-ferromagnetic metal tube, in particular a stainless steel tube, on the inside with an insulating layer made from a suitable plastic, in particular from hard rubber, soft rubber or polyfluoroethylene, preferably polytetrafluoroethylene. It is also possible for mechanical strengthening means such as, for example, metal grids, to be embedded in this coating.

Arranged on the outer lateral surface of the measuring tube 1 is a single pair 2 of means, lying on a magnetic field diameter 3 of the measuring tube 1, for generating a magnetic field extending in the direction of the diameter; this magnetic field is spatially inhomogeneous.

The means for generating the magnetic field comprise a single pair of coils composed of a first coil 21 and a second coil 22, a single pair of coil cores composed of a first coil core 23 and a second coil core 24, a pair of pole shoes composed of a first pole shoe 25 and a second pole shoe 26, and an excitation circuit 5 serving to feed the coils 21, 22 with a current i. The coils 21, 22 are connected in series in the same sense.

The pole shoes 25, 26 are flat soft magnetic sheets with a central bore, and the coil cores 23, 24 are soft magnetic sleeves, so that in case of need a further electrode can be arranged in the measuring tube 1 per pole shoe: If the position represented in FIG. 1 is the mounting position of the electromagnetic flowmeter, a further electrode arranged in the bore of the pole shoe 26 serves the purpose of connection to a circuit zero point; if, in turn, the position represented in FIG. 1 is the mounting position of the electromagnetic flowmeter, a further electrode arranged in the bore of the pole shoe 25 can serve to monitor whether the measuring tube 1 is completely filled with the fluid to be measured.

The current i can have one of the characteristics usual in the case of electromagnetic flowmeters; the current i can thus be, for example, a bipolar direct current or a pulsating or a continuous alternating current.

The circuits which are customary in the field of electromagnetic flowmeters and described in the prior art are suitable as circuits for generating the direct currents or alternating currents just mentioned, and so it is possible here to dispense with explaining their details.

The pair of coils 21, 22, the pair of coil cores 23, 24 and the pair of pole shoes 25, 26 have the same axis, which is simultaneously a diameter of the measuring tube 1. This diameter is the magnetic field diameter 3 already mentioned above.

As is usual in the case of electromagnetic flowmeters, the coil cores 23, 24 can be either ferromagnetic—as assumed in the case of the exemplary embodiments—or non-ferromagnetic. The magnetic circuit is closed by an appropriate magnetic return sheet 6.

Also arranged on and in the measuring tube 1 are a first electrode pair with a first and a second electrode 41, 42, a second electrode pair with a third and a fourth electrode 43, 44 and a third electrode pair with a fifth and a sixth electrode 45, 46. Each electrode has a surface which is larger than a dot, touches the fluid and is fixed in the wall of the measuring tube 1 in a fluid-tight fashion.

The two electrodes 41, 42 of the first electrode pair are arranged on a diameter of the measuring tube 1, which is denoted below as first electrode diameter $4_1$. In operation of the electromagnetic flowmeter, a first electrode voltage $u_1$ can be tapped at the two electrodes 41, 42.

The two electrodes 43, 44 of the second electrode pair are arranged on a diameter of the measuring tube 1 which is denoted below as second electrode diameter $4_2$. In operation of the electromagnetic flowmeter, a second electrode voltage $u_2$ can be tapped at the two electrodes 43, 44.

The two electrodes 45, 46 of the third electrode pair are arranged on a diameter of the measuring tube 1 which is denoted below as third electrode diameter $4_3$. In operation of the electromagnetic flowmeter, a third electrode voltage $u_3$ can be tapped at the two electrodes 45, 46.

The first electrode diameter $4_1$ forms an angle of 90° with the magnetic field diameter 3. The second electrode diameter $4_2$ forms an angle of 45° with the first electrode diameter $4_1$ and an angle of 90° with the third electrode diameter $4_3$. The two latter angles do not need to be observed exactly and can, for example, deviate by approximately 10% therefrom. It is then necessary for the value, valid for exactly 45° or exactly 90°, of the multiplier factor f explained in more detail below to be selected to deviate slightly therefrom.

Figure 2:
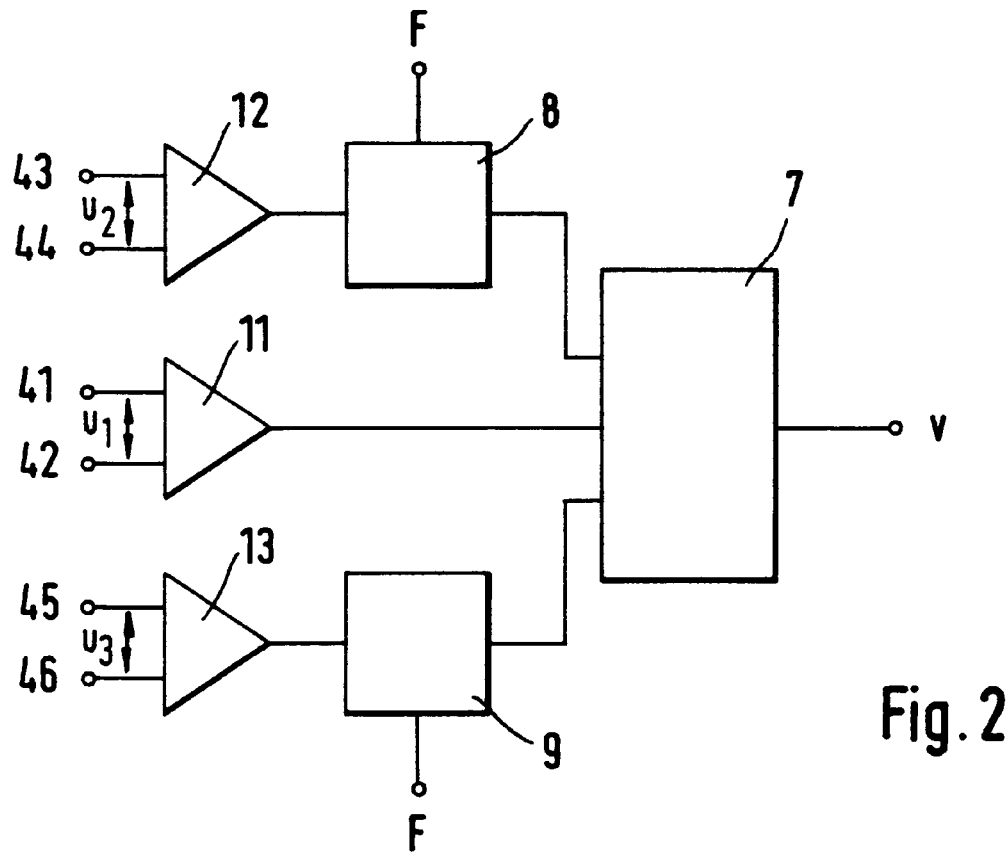
FIG. 2 shows, in the manner of a block diagram, the principle of a measuring circuit applied in the invention.

The principle of a measuring circuit applied in the case of the invention is represented in the manner of a block diagram in FIG. 2; this circuit serves to process the electrode voltages $u_1$, $u_2$, $u_3$.

The first electrode voltage $u_1$ is fed on the input side to a first decoupling amplifier 11, that is to say a first input is connected to the first electrode 41 and a second input is connected to the second electrode 42.

The second electrode voltage $u_2$ is fed on the input side to a second decoupling amplifier 12, that is to say a first input is connected to the third electrode 43 and a second input is connected to the fourth electrode 44.

The third electrode voltage $u_3$ is fed on the input side to a third decoupling amplifier 13, that is to say a first input is connected to the fifth electrode 45 and a second input is connected to the sixth electrode 46.

A first input of a first multiplier stage 8 is connected to an output of the second decoupling amplifier 12. A second input of the first multiplier stage 8 is fed a multiplier signal F representing a multiplier factor f; the multiplier factor f lies between 0.1 and 0.7.

A first input of a second multiplier stage 9 is connected to an output of the third decoupling amplifier 13. A second input of the second multiplier stage 9 is fed the same multiplier signal F representing the multiplier factor f lying between 0.1 and 0.7.

A first input of an adder stage 7 is connected to an output of the first decoupling amplifier 11, a second input of the adder stage 7 is connected to an output of the first multiplier stage 8, and a third input of the adder stage 7 is connected to an output of the second multiplier stage 9.

The three decoupling amplifiers 11, 12, 13 have the same gain and are thus designed to be identical to one another as far as possible. An output of the adder stage 7 supplies the signal v proportional to the volume flow rate.

Figure 3:
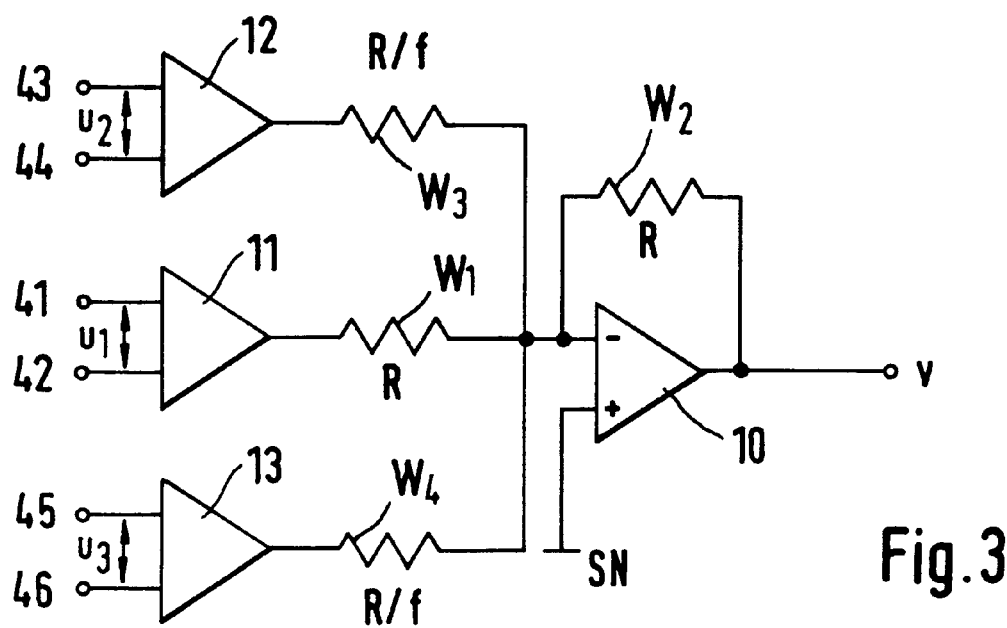
FIG. 3 shows, in the manner of a block diagram, a preferred realization of the measuring circuit of FIG. 2.

FIG. 3 shows, in the manner of a block diagram, a preferred realization of the measuring circuit, the three decoupling amplifiers 11, 12, 13, which are as identical as possible, again being provided.

The output of the first decoupling amplifier 11 is coupled, via a first resistor $W_1$ having a resistance value R, to an inverting input of a differential amplifier 10 of which a non-inverting input is connected to a circuit zero point SN. An output of the differential amplifier 10 is connected to its inverting input via a second resistor $W_2$, having the resistance value R, and supplies the signal proportional to the volume flow rate.

The output of the second decoupling amplifier 12 is coupled, via a third resistor $W_3$ having a resistance value R/f, and the output of the third decoupling amplifier 13 is coupled, via a fourth resistor having the resistance value R/f, to the inverting input of the differential amplifier 10. The resistance value R is thus multiplied by the reciprocal of the multiplier factor f.

In the embodiment of FIG. 3, the inverting input of the differential amplifier 10 corresponds to the adder stage of FIG. 2, which here is thus only an adding connection point.

The explanations of FIGS. 2 and 3 assume that the electrode voltages $u_1$, $u_2$, $u_3$, because they are analog voltages, are also further processed in an analog fashion;

consequently, the subcircuits 8, 9, 10, 11, 12, 13 are analog circuits. However, this is not mandatory; digital further processing of the electrode voltages $u_1$, $u_2$, $u_3$ is also possible.

Figure 4:
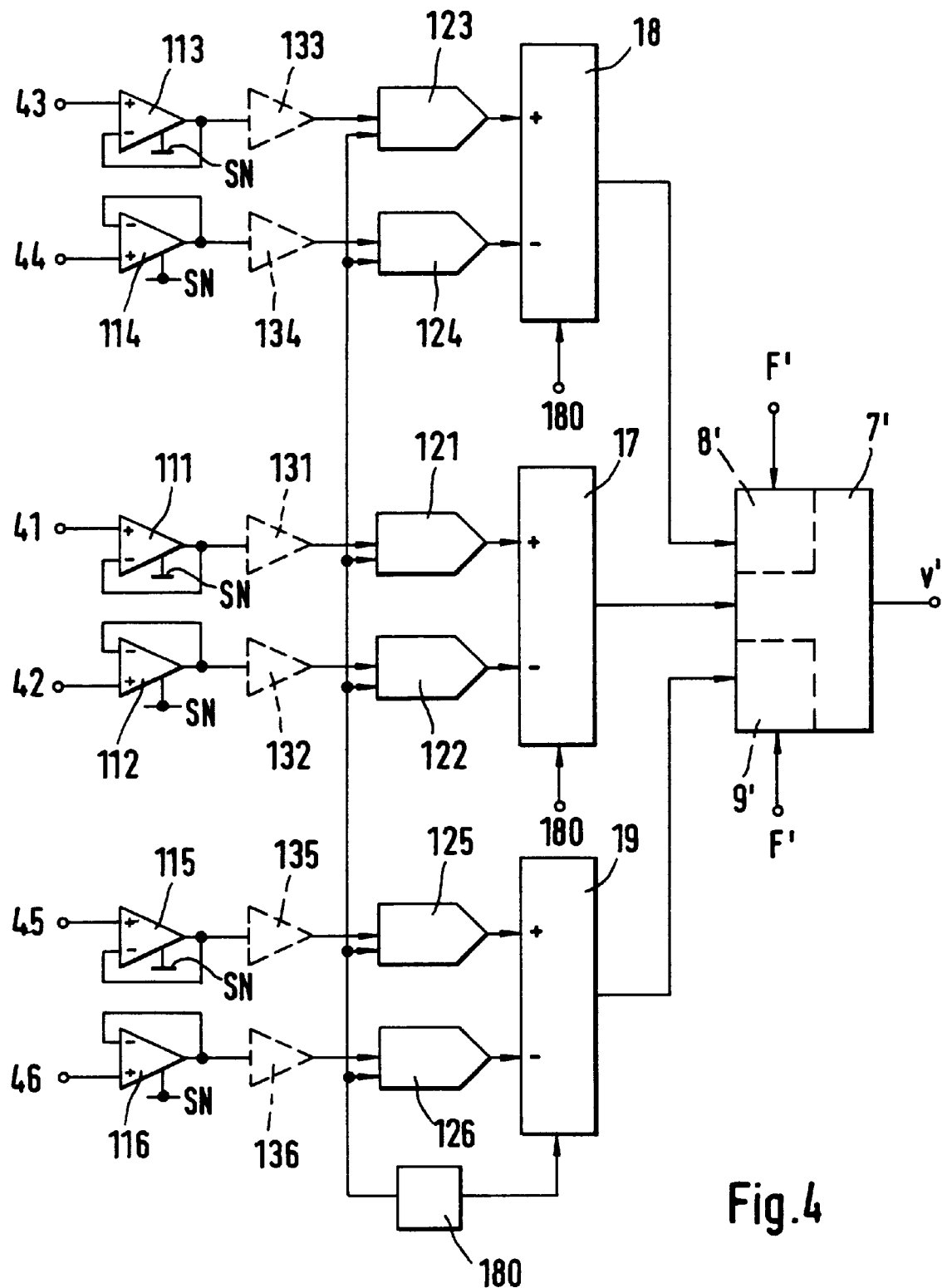
FIG. 4 shows, in the manner of a block diagram, a preferred development of the measuring circuit of FIG. 2.

For this purpose, FIG. 4 shows, in the manner of a block diagram, a preferred development of the measuring circuit of FIG. 2. This development is based on the principle that a dedicated decoupling amplifier 111, 112, 113, 114, 115, 116 is assigned to the corresponding electrode 41, 42, 43, 44, 45, 46. Immediately thereafter, the output signals of these decoupling amplifiers are subjected to analog-to-digital conversion, and only the digital signals are further processed in accordance with the basic principle, so far explained, of the invention—but now in a digital fashion.

The decoupling amplifiers 111, 112, 113, 114, 115, 116 are operational amplifiers whose respective non-inverting input is connected to the corresponding electrode 41, 42, 43, 44, 45, 46, while the respective inverting input is connected to the circuit zero point SN. The decoupling amplifiers 111, 112, 113, 114, 115, 116 have the same gain, and are thus constructed to be as identical as possible to one another.

Each decoupling amplifier 111, 112, 113, 114, 115, 116 is followed by a corresponding analog-to-digital converter 121, 122, 123, 124, 125, 126 whose signal input is connected to the output of the corresponding decoupling amplifier, if appropriate with the interposition of a respective amplifier 131, 132, 133, 134, 135, 136, as is indicated by dashes.

A first subtractor 17 follows to the respective output of the analog-to-digital converters 121, 122. Consequently, for example, the minuend input of the subtractor 17 is connected to the output of the analog-to-digital converter 121, and the subtrahend input thereof is connected to the output of the analog-to-digital converter 122.

A second subtractor 18 follows to the respective output of the analog-to-digital converters 123, 124. Consequently, for example, the minuend input of the subtractor 18 is connected to the output of the analog-to-digital converter 123 and the subtrahend input thereof is connected to the output of the analog-to-digital converter 124.

A third subtractor 19 follows to the respective output of the analog-to-digital converters 125, 126. Consequently, for example, the minuend input of the subtractor 19 is connected to the output of the analog-to-digital converter 125 and the subtrahend input thereof is connected to the output of the analog-to-digital converter 126.

A clock generator 180 feeds the analog-to-digital converters 121, 122, 123, 124, 125, 126 with a sampling signal whose frequency is higher than approximately 1 kHz; this frequency is preferably of the order of magnitude of 10 kHz, that is to say between 5 kHz and 50 kHz. Furthermore, the clock generator 180 feeds the subtractor 17, 18, 19 with a clock signal of suitable frequency which can be equal to the frequency of the clock signal controlling the analog-to-digital converters.

To simplify FIG. 4, multipliers 8', 9' mentioned below are represented as subcircuits of an adder 7' mentioned below; this appears to be permissible straight away, since the functions of adding and multiplying are usually realized by means of digital processors, in particular microprocessors.

A first input of a first multiplier 8' is connected to an output of the subtractor 18. A digital multiplier signal F' representing the first multiplier factor f is fed to a second input of the multiplier 8'.

A first input of a second multiplier 9' is connected to an output of the subtractor 19. The digital multiplier signal F' representing the first multiplier factor f is fed to a second input of the multiplier 9'.

A first input of an adder 7' is connected to an output of the subtractor 17, a second input of the adder 7' is connected to an output of the first multiplier 8', and a third input of the adder 7' is connected to an output of the second multiplier 9'. An output of the adder 7' supplies a digital signal v' proportional to the volume flow rate.

The abovementioned signal v or v' can be visualized by means of a display or in another suitable way, for example by means of a chart recorder. The signal v or v' can, however, also be incorporated only, or in addition to this visualization, into a more comprehensive processing of measured values.

In an electromagnetic flowmeter which was realized and had a measuring tube nominal diameter of 50 mm and a design which corresponded approximately in scale to the cross section of FIG. 1, the multiplier factor f had a value of 0.3. A value of 0.3 likewise holds for a nominal diameter of up to 100 mm and for designs, comparable to FIG. 1, of the means for generating the magnetic field.

In the case of larger nominal diameters than 100 mm, the dimensions of the means for generating the magnetic field are more compact in relation to the nominal diameter than is represented in FIG. 1, and the multiplier factor f has values of between 0.35 and 0.7.

What is claimed is:

1. A method for measuring the volume flow rate of an electrically conductive fluid flowing in a measuring tube using an electromagnetic flowmeter comprising the steps of:

generating a magnetic field which is spatially inhomogeneous in the direction of a magnetic field diameter of the measuring tube, providing a first electrode voltage at a first and a second electrode, providing a second electrode voltage at a third and a fourth electrode, providing a third electrode voltage at a fifth and a sixth electrode, processing only a portion of the second electrode voltage which lies between 0.1 and 0.7 of the second electrode voltage together with the first electrode voltage, and processing only the same portion of the third electrode voltage which lies between 0.1 and 0.7 of the third electrode voltage together with the first electrode voltage.

2. An electromagnetic flowmeter for measuring a volume flow rate:

having a measuring tube,
   in which during operation an electrically conductive fluid to be measured flows, and
   which is constructed in an electrically insulating fashion on its inside touching the fluid, having a single pair of means, arranged on the lateral surface of the measuring tube on a magnetic field diameter of the measuring tube, for generating a magnetic field which is spatially inhomogeneous in the direction of the magnetic field diameter, having a first electrode pair, which comprises a first and a second electrode and at which a first electrode voltage is produced during operation, having a second electrode pair, which comprises a third and a fourth electrode and at which a second electrode voltage is produced during operation, having a third electrode pair, which comprises a fifth and a sixth electrode and at which a third electrode voltage is produced during operation, the electrodes having a surface which is larger than a dot but finite, and touching the fluid, the first electrode pair being arranged on a first electrode diameter of the measuring tube, which forms an angle of 90° with the magnetic field diameter, the second electrode pair being arranged on a second electrode diameter of the measuring tube, which forms an angle of approximately 45° with the first electrode diameter, and the third electrode pair being arranged on a third electrode diameter of the measuring tube, which forms an angle of approximately 90° with the second electrode diameter, having an excitation circuit for feeding the means for generating the magnetic field with current, and having a measuring circuit for processing the first, second and third electrode voltage, which comprises:

an adder stage having a first, a second and a third input and an output, a first multiplier stage having a first and a second input as well as an output, a second multiplier stage having a first and a second input as well as an output, in which measuring circuit the first electrode voltage is coupled to the first input of the adder stage, the second electrode voltage is coupled to the first input of the first multiplier stage, the third electrode voltage is coupled to the first input of the second multiplier stage, the second input of the first multiplier stage and the second input of the second multiplier stage are fed a multiplier signal (F) representing a multiplier factor f which lies between 0.1 and 0.7, and the output of the adder stage supplies a signal proportional to the volume flow rate.

3. The electromagnetic flowmeter as claimed in claim 2, wherein the first electrode voltage is fed on an input side to a first decoupling amplifier with one input, the second electrode voltage is fed on an input side to a second decoupling amplifier with one input, the third electrode voltage is fed on an input side to a third decoupling amplifier with one input, which decoupling amplifiers have the same gain, the output of the first decoupling amplifier is connected, via a first resistor having a resistance value R, to an inverting input of a differential amplifier, of which a non-inverting input is connected to a circuit zero point, and of which an output is connected to an inverting input via a second resistor having the resistance value R, and supplies the signal proportional to the volume flow rate, the output of the second decoupling amplifier is connected to the inverting input of the differential amplifier via a third resistor having a resistance value R/f, and the output of the third decoupling amplifier is connected to the inverting input of the differential amplifier via a fourth resistor having the resistance value R/f.

* * * * *

UNITED STATES PATENT AND TRADEMARK OFFICE
CERTIFICATE OF CORRECTION

PATENT NO. : 6,094,992
DATED : August 1, 2000
INVENTOR(S) : Franz Mesch and Boris Horner It is certified that error appears in the above-indentified patent and that said Letters Patent is hereby corrected as shown below:

On the Title Page

The following Assignee is added to this patent:

Endress + Hauser Flowtec AG

Signed and Sealed this

Tenth Day of April, 2001

*Attest:*

NICHOLAS P. GODICI

*Attesting Officer*  *Acting Director of the United States Patent and Trademark Office*